United States Patent [19]

Muraoka et al.

[11] Patent Number: 5,208,971

[45] Date of Patent: May 11, 1993

[54] PROCESS OF MANUFACTURING A MAGNETIC HEAD

[75] Inventors: Shunsaku Muraoka; Eisuke Sawai, both of Hirakata; Etsuko Suzuki, Neyagawa, all of Japan

[73] Assignee: Matsushita Electric Industrial Co., Ltd., Osaka, Japan

[21] Appl. No.: 700,461

[22] Filed: May 15, 1991

[30] Foreign Application Priority Data

May 17, 1990 [JP] Japan .................................. 2-128477

[51] Int. Cl.⁵ .............................................. G11B 5/127
[52] U.S. Cl. .................................. 29/603; 204/192.15; 204/192.23
[58] Field of Search ............ 204/192.2, 192.15, 192.22; 29/603; 360/125, 126

[56] References Cited

U.S. PATENT DOCUMENTS 4,964,007  10/1990  Satomi et al. ..................... 360/125

FOREIGN PATENT DOCUMENTS 61-61212   3/1986  Japan .................................. 29/603
61-82305   4/1986  Japan .................................. 29/603
61-104305  5/1986  Japan .................................. 29/603
62-264409 11/1987  Japan .................................. 29/603

*Primary Examiner*—Aaron Weisstuch
*Attorney, Agent, or Firm*—Wenderoth, Lind & Ponack

[57] ABSTRACT

A method of making a magnetic head wherein a metal material is sandwiched between non-magnetic substrates, including the steps of: forming a magnetic metal material at least on one side of a non-magnetic substrate; forming by sputtering a crystallization glass layer at least on one side of a compound substrate prepared by forming an anti-diffusion film on the magnetic metal material; then heat-treating in an oxygen containing atmosphere the compound substrate on which the crystallization glass has been formed; further laminating together a number of the aforesaid compound substrates under pressure and then processing (such as by cutting, grinding, and heat-treating) the laminate.

4 Claims, 3 Drawing Sheets

PROCESS OF MANUFACTURING A MAGNETIC HEAD

BACKGROUND OF THE INVENTION

1. Field of the Invention

This invention relates to a process of manufacturing a magnetic head used for a magnetic recording and reproduction apparatus such as a VCR.

2. Description of the Prior Art

With recently increasing demands for a higher recording density and a higher definition of picture quality, magnetic heads using high-saturation magnetic flux density metals, such as Permalloy, Sendust, and amorphous alloys have been highlighted in addition to the conventional ferrite materials used for magnetic head cores. Among them, amorphous alloys are excellent in terms of corrosion resistance, wear resistance, and other properties and thus are particularly promising materials for high-performance magnetic heads.

FIG. 2 is an oblique view of a head using an amorphous alloy; the head core consists of an amorphous alloy 1 sandwiched between non-magnetic substrates 2. A pair of core halves are connected across a gap forming surface 3 with a fused low-melting point glass 4. The amorphous alloy 1 is sandwiched between the non-magnetic substrates 2 by means of a low-melting point crystallization glass 5, and an anti-diffusion film 6 of $SiO_2$ is inserted between the amorphous alloy 1 and the low-melting point crystallization glass 5 to prevent reaction between the amorphous alloy and the low-melting point crystallization glass.

FIGS. 3(a)–3(c) are oblique views showing a conventional process of manufacturing a magnetic core which uses an amorphous alloy. First, an amorphous alloy 1 is formed by sputtering on one side of a non-magnetic substrate 2, and an anti-diffusion film 6 of $SiO_2$ is then formed by sputtering on the amorphous alloy (FIG. 3(a)). Next, a low-melting point crystallization glass film 5 is formed by sputtering on the anti-diffusion film 6 (FIG. 3(b)). Then, a number of the above substrates are laminated in layers and heat-treated under pressure to form a laminate (FIG. 3(c)). This laminate is finally processed (such as by cutting, grinding, and heat-treating it) into a finished magnetic head. In general, an amorphous alloy has a crystallization temperature and, if heat-treated at a temperature above this temperature, turns from an amorphous to a crystalline state to become magnetically less powerful. Due to the requirement for glass bonding and any other heat treatment to be carried out at a temperature lower than such a crystallization temperature, low-melting point glass whose softening point is lower than the crystallization temperature of an amorphous ally is generally used for bonding to an amorphous alloy magnetic head core. Normally, low-melting point glass is poor in mechanical strength and can hardly withstand the processing to manufacture a magnetic head. For this reason, the glass used to bond an amorphous alloy 1 and a non-magnetic substrate 2 is low-melting point crystallization glass which is mechanically strong with its softening point increasing after crystallization.

A great problem in practical use has, however, been that an amorphous magnetic head prepared by the above conventional process of manufacturing a magnetic head has many voids at the bonding interface between the non-magnetic substrate 2 and the low-melting point crystallization glass 5 as shown in FIG. 4 and the actual use of such a magnetic head in a deck deteriorates the properties of the head due to the tape shavings deposited within the voids developed at the bonding interface. Weak bonding between the non-magnetic substrate and the amorphous alloy due to the influence of voids and the resulting poor yield rate in the manufacture of magnetic heads have been another problem.

SUMMARY OF THE INVENTION

An object of this invention is to provide strong layer bonding by eliminating the voids which develop in large numbers at the bonding interface between non-magnetic substrates and low-melting point crystallization glass of an amorphous alloy magnetic head.

To achieve the above object, this invention provides a method of manufacturing a magnetic head in which a layer of a magnetic metal material is first formed at least on one side of a non-magnetic substrate; a layer of a crystallization glass is then formed by sputtering at least on one side of a compound substrate made by forming an anti-diffusion film on the magnetic metal material layer; next the compound substrate on which the crystallization glass layer has been formed is heat-treated in an atmosphere containing oxygen; a number of the compound substrates are laminated in layers and heat-treated under pressure to form a laminate, and this laminate is finally processed (such as by cutting, grinding, and heat-treating it) into a finished magnetic head.

Preferably, the non-magnetic substrate is an oxide substrate, the magnetic metal material is an amorphous alloy, and the crystallization glass is a low-melting point crystallization glass possessing a softening point lower than the crystallization temperature of the amorphous alloy.

The voids which develop at the bonding interface between a non-magnetic substrate and low-melting point crystallization glass of an amorphous alloy magnetic head prepared by a conventional process are considered to develop as follows. The film of low-melting point crystallization glass formed by sputtering on a non-magnetic substrate is unstable due to the lack of oxygen and such an unstable low-melting point crystallization glass reacts with the oxygen within the non-magnetic substrate, if it is an oxide one, while being heat-treated at the time of laminate formation. This makes the area of the non-magnetic substrate deprived of oxygen mechanically weak enough to be partially broken into holes during tape sliding, giving an appearance of voids developing at the bonding interface.

Hence, the manufacturing process of this invention heat-treats a compound substrate on which a low-melting point crystallization glass film has been formed by sputtering in an atmosphere containing oxygen before laminate formation to allow for stabilization of the low-melting point crystallization glass by reaction with oxygen. this treatment eliminates the problem of void development for more stable bonding of the low-melting point crystallization glass film formed by sputtering.

DESCRIPTION OF THE PREFERRED EMBODIMENTS

Figure 1A:
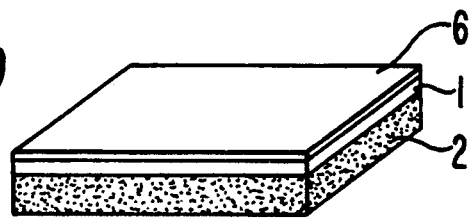
FIGS. 1(a), 1(b), 1(c), 1(d), 1(e), and 1(f) are oblique views of an embodiment of this invention relating to a process of manufacturing a magnetic head.
Figure 1B:
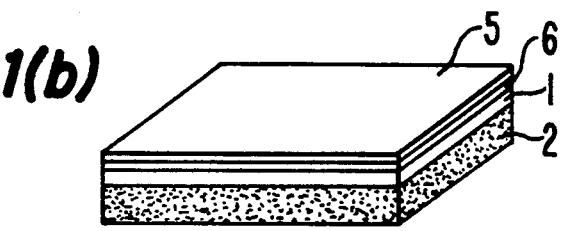
Figure 1C:
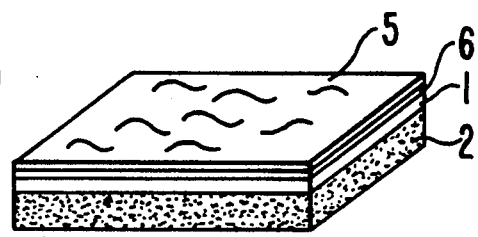

An embodiment of this invention is explained below with reference to FIGS. 1(a)-1(f). As shown in FIG. 1(a), an amorphous alloy head core 1 is first formed by a film formation method such as sputtering on one side of a non-magnetic substrate 2. An anti-diffusion film 6 of $SiO_2$ is then formed on the amorphous alloy film prepared as above. A low-melting point crystallization glass 5 is then formed on the anti-diffusion film (FIG. 1(b)).

The method of film formation employed in this embodiment was a sputtering method and the sputtering device used was equipped with three targets for depositing an amorphous alloy, $SiO_2$, and low-melting point crystallization glass, respectively. For the purpose of this embodiment, the film thickness of the amorphous alloy was 20 μm, that of the $SiO_2$ was 1 μm, and that of the low-melting point crystallization glass was 0.1 μm–1 μm. The amorphous alloy used for this embodiment was a quarternary alloy of CoNbZrTa and its properties were: saturation magnetic flux density Bs=8,300 gauss; crystallization temperature $Tx_1$=575° C.; and Curie temperature Tc=480° C. The low-melting point crystallization glass in this embodiment was composed mainly of PbO with a softening point Ts=440° C. and crystallization temperature $Tx_2$=520° C. The non-magnetic substrate used was a magnesium titanate-based oxide substrate.

The compound substrate prepared as above was heat-treated in air at a temperature Ta higher than Ts but lower than $Tx_2$. The standing time for this treatment was 20 minutes or less and the rates of temperature increase and decrease were 10° C./min. or more. This condition meets the required temperature range within which the low-melting point crystallization glass is neither softened nor crystallized. Under this heat treatment, the unstable low-melting point crystallization glass 5 formed on the anti-diffusion film 6 is softened and reacts with the oxygen in the air to become stable (FIG. 1(c)).

Figure 1D:
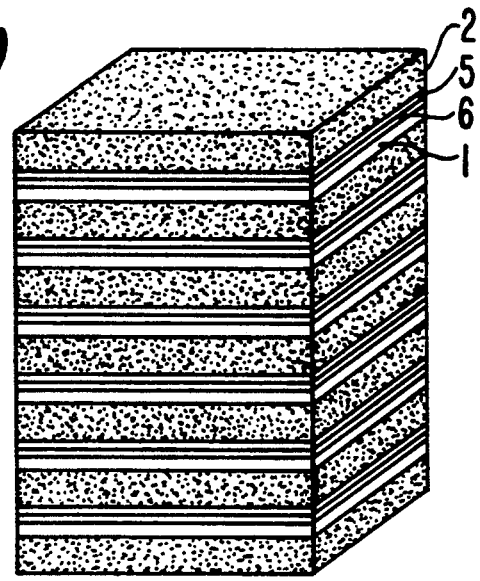
Figure 1E:
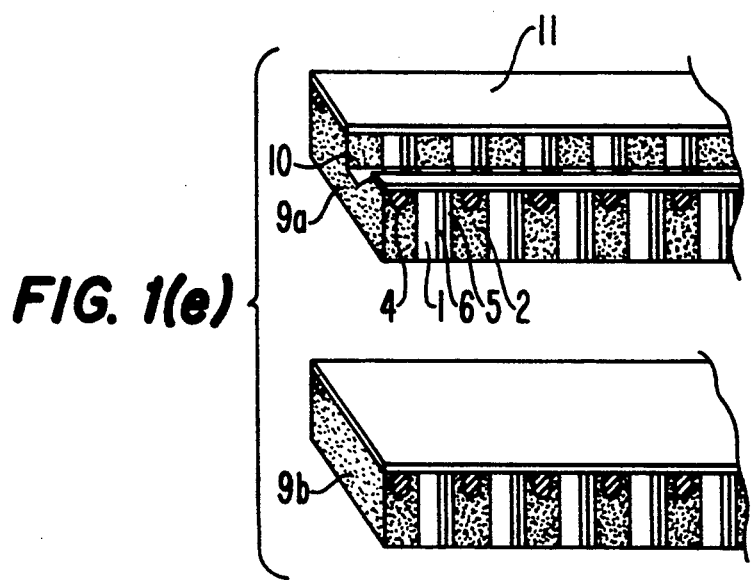
Figure 1F:
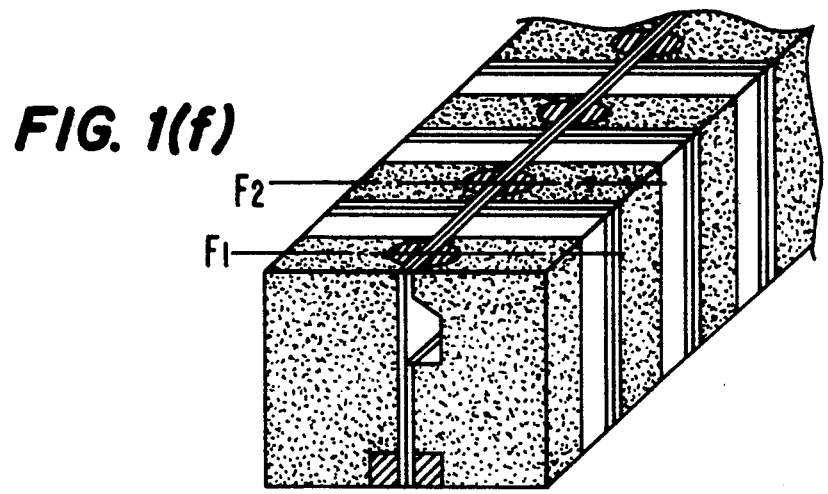

Next, a number of the substrates laminated in layers were heat-treated under pressure to form a laminate (FIG. 1(d)). The conditions for this heat treatment under pressure were: temperature Ta higher than Ts but lower than $Tx_1$; standing time of 30 minutes or more; and temperature increase/decrease rates of 10° C./min. or less. Under this heat treatment, the low-melting point crystallization glass film is crystallized to become stronger mechanically and, at the same time, is softened at a temperature which is much higher than when in the noncrystalline state. As a result, the bonding layers are not loosened or peeled off in the subsequent process of manufacturing a magnetic head.

Figure 2:
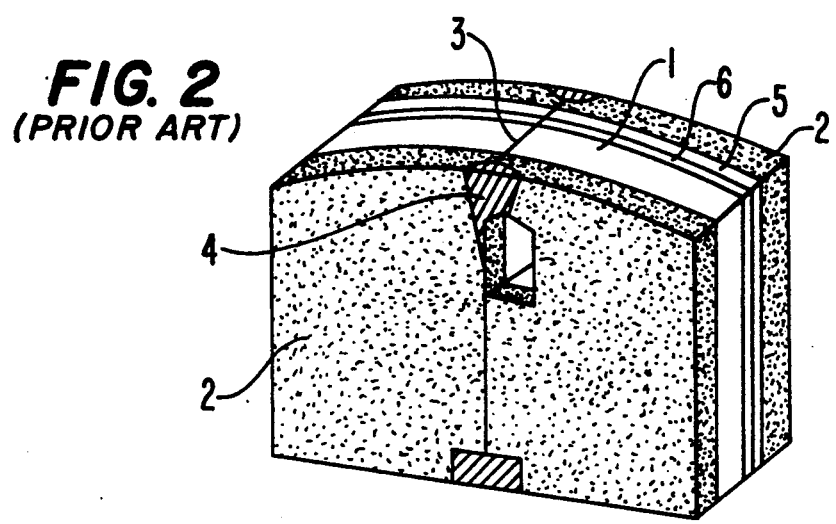
FIG. 2 is an oblique view of an amorphous alloy magnetic head.
Figure 3A:
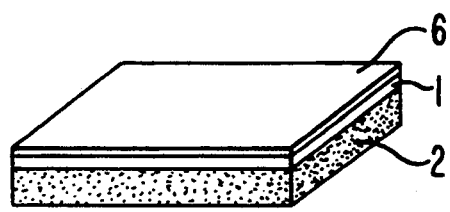
FIGS. 3(a)–3(c) are oblique views of a conventional process of manufacturing a magnetic head.
Figure 3B:
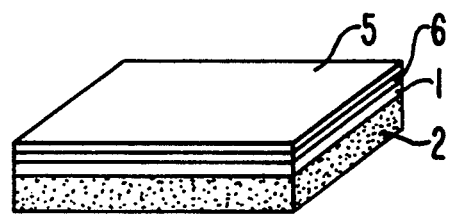
Figure 3C:
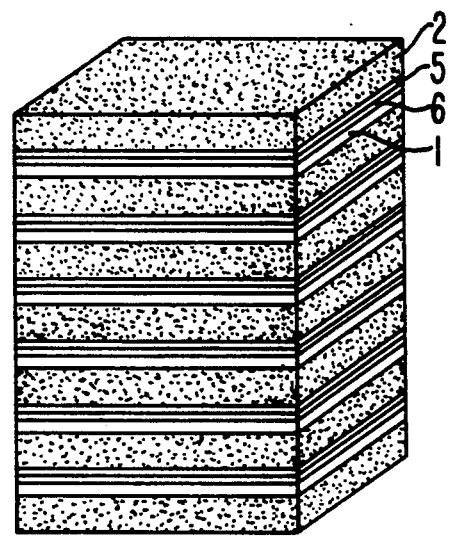
Figure 4:
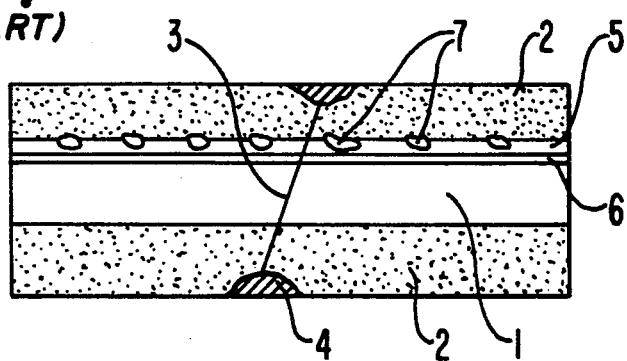
FIG. 4 shows a sliding surface of a magnetic head prepared by a conventional manufacturing process.

This is followed by the processing of the aforementioned laminate to prepare a pair of core bars 9a and 9b. A winding groove 10 is formed on the gap forming surface of one core bar, the gap forming surface is ground to give a smooth surface, and a layer 11 of non-magnetic material, e.g., $SiO_2$ of a desired thickness if formed by a film formation method such as sputtering (FIG. 1(e)). Subsequently, the gap forming surfaces of two core bars are butted, heat-treated under pressure, and cut along the lines F1 and F2 to a required core width (FIG. 1(f)). The front of the head is polished to finalize the manufacture of a head chip illustrated in FIG. 2.

A magnetic head manufactured as above proved quite favorable as it, unlike a counterpart prepared by a conventional manufacturing process, had no voids developing at the bonding interface between the low-melting point crystallization glass and the non-magnetic substrate. The bonding strength was also improved for a much better yield rate in the manufacture of magnetic heads.

This invention is not, however, limited to an amorphous alloy magnetic head but may be applied to magnetic heads using other magnetic metals to obtain similar effects.

What is claimed is:

1. A method of manufacturing a magnetic head, comprising the steps of:

forming a plurality of compound substrates each by forming a magnetic metal material layer at least on one side of a non-magnetic oxide substrate and forming an anti-diffusion film on said magnetic metal material layer, and forming a crystallization glass layer by sputtering at least on one side of said non-magnetic oxide substrate on which said anti-diffusion film and said magnetic metal material layer have been formed;

heat-treating each of the plurality of compound substrates in an atmosphere containing oxygen;

laminating the heat-treated plurality of compound substrates;

heat-treating the laminated plurality of compound substrates under pressure to form a laminate;

processing said laminate to obtain a pair of core bars each having a gap forming surface;

grinding said gap forming surface of each of said core bars to smooth said gap forming surface;

forming a non-magnetic material layer on said gap forming surface;

butting said core bars at said gap forming surfaces; and heat-treating said gap forming surfaces under pressure so as to bond said gap forming surfaces of said core bars.

2. A method according to claim 1, wherein said magnetic metal material is an amorphous material.

3. A method according to claim 2, wherein said crystallization glass is a low-melting point glass having a softening point which is lower than a crystallization temperature of said magnetic metal material.

4. A method according to claim 1, wherein said crystallization glass is a low-melting point glass having a softening point which is lower than a crystallization temperatures of said magnetic metal material.

* * * * *